United States Patent [19]

Makino et al.

[11] 4,366,851

[45] Jan. 4, 1983

[54] PNEUMATIC RADIAL TIRE FOR HEAVY LOAD VEHICLES

[75] Inventors: Shigeo Makino, Tokorozawa; Noboru Sugimura, Kodaira, both of Japan

[73] Assignee: Bridgestone Tire Co., Ltd., Tokyo, Japan

[21] Appl. No.: 269,439

[22] Filed: Jun. 2, 1981

[30] Foreign Application Priority Data

Jun. 13, 1980 [JP] Japan .............................. 55-81605[U]

[51] Int. Cl.³ .......................... B60C 15/06; B60C 9/08
[52] U.S. Cl. ................................. 152/356 R; 152/359; 152/362 R; 152/362 CS; 152/354 R
[58] Field of Search ............ 152/354 R, 354 RB, 355, 152/356 R, 356 A, 357 R, 359, 362 R, 362 CS

[56] References Cited

U.S. PATENT DOCUMENTS

| | | | |
|---|---|---|---|
| 3,612,137 | 10/1971 | Guyot ................................ | 152/362 R |
| 3,682,223 | 8/1972 | Simpson ............................ | 152/362 R |
| 3,722,568 | 3/1973 | Maiocchi .......................... | 152/362 CS |
| 4,086,948 | 5/1978 | Suzuki et al. .................... | 152/362 CS |
| 4,120,338 | 10/1978 | Mirtain ............................. | 152/362 R |
| 4,185,677 | 1/1980 | Motomura et al. ............. | 152/362 R |
| 4,214,620 | 7/1980 | Mezzanotte ..................... | 152/354 R |

Primary Examiner—Edward C. Kimlin
Assistant Examiner—Lois E. Boland
Attorney, Agent, or Firm—Sughrue, Mion, Macpeak & Seas

[57] ABSTRACT

A pneumatic radial tire for heavy load vehicles comprising a body reinforcement and a bead portion reinforcement, in which the bead portion reinforcement substantially continuously covers the carcass ply wound around a bead core up to the inside of the tire, the upper end of the turn-up portion of the carcass ply and the outside upper end of the bead portion reinforcement covering the upper end of the carcass ply are arranged at an area other than a bead portion flexible region defined by two segments $\overline{BC}$ and $\overline{AD}$ as shown in attached FIG. 3, the bead portion reinforcement makes use of a cord having a modulus which corresponds to 15 to 60% of that of the ply cord of the carcass, and a tension at 100% elongation of a soft stiffener corresponds to 5 to 30% of that of a hard stiffener, the soft and hard stiffeners being disposed on the bead core one upon the other.

9 Claims, 4 Drawing Figures

PNEUMATIC RADIAL TIRE FOR HEAVY LOAD VEHICLES

BACKGROUND OF THE INVENTION

1. Field of the Invention

This invention relates to a pneumatic radial tire for heavy load vehicles and more particularly to a so-called combi-radial tire particularly useful for truck, bus, or the like, and including a bead portion having excellent durability.

2. Description of the Prior Art

The above mentioned kind of radial tire for heavy load vehicles is generally divided into two kinds of tires, that is, an all steel tire in which carcass and belt are composed of metal cords and a combi-tire which makes use of an organic textile cord carcass and steel cord belt. These all steel tires and combi-tire have advantages and disadvantages, respectively.

The all steel tire usually makes use of a single ply carcass. On the contrary, the combi-tire not used for passenger car but used for heavy load vehicles makes use of a number of plies. For example, if the bead portion is composed of three plies, two inner plies are wound around a bead core from the inside toward the outside thereof to form a turn-up portion, while the outer ply is wound around the bead core from the outside toward the inside thereof, thereby constituting an up-down construction.

Such a carcass ply arrangement considerably lowers the productivity of the tire at the step of forming the carcass ply. But, it is obliged to use such arrangement owing to the following reasons. That is, the combi-tire for heavy load vehicles tends to concentrate stress at the upper end of the turn-up portion of the carcass owing to the tension balance of the carcass when the inflated tire runs under load. As a result, there is a risk of separation failure being induced at the bead portion which is a vital defect to the tire.

In order to eliminate such lowered productivity, three carcass plies are wound around the bead core from the inside toward the outside thereof to form the turn-up portion. Outside these turn portions one chafer composed of metal cords is arranged and, outside such chafer is arranged an additional chafer composed of organic textile cord layer thereby forming a bead portion reinforcement.

Such bead portion reinforcement is advantageous for tire productivity, but it is impossible to completely prevent separation failure at the upper ends of the carcass turn-up portion and bead portion reinforcement, thereby shortening the durable life of the tire.

SUMMARY OF THE INVENTION

An object of the invention, therefore, is to provide a pneumatic radial tire for heavy load vehicles which can efficiently and suitably prevent the separation failure at the bead portion without deteriorating the tire productivity and which has a sufficiently satisfactory tire life.

A feature of the invention is the provision of a pneumatic radial tire for heavy load vehicles comprising a carcass body reinforcement including in combination a carcass composed of at least two organic textile cord plies having cords arranged in a plane inclusive of the rotary axis of the tire or a plane extremely slightly inclined with respect to the above mentioned plane and wound around a bead core from the inside toward the outside thereof to form a turn-up portion. Hard and soft stiffeners are disposed one upon the other on the bead core and sandwiched between the carcass and its turn-up portion. A belt composed of a plurality of metal cord layers is superimposed about the crown portion of the carcass. A bead portion reinforcement composed of at least two organic textile cord layers extends along the turn-up portion of the carcass and over and covering the upper end of the turn-up portion of the carcass. The cords of these plies are crossed with each other. The bead portion reinforcement substantially continuously covers the carcass ply wound around the bead core up to the inside of the tire. The upper end of the turn-up portion of the carcass ply and the upper end of the bead portion reinforcement covering the upper end of the turn-up portion of the carcass ply are arranged at an area other than a bead portion flexible region defined by a segment $\overline{BC}$ for connecting a point C at which the outer contour of the bead portion of the tire is separated from the rim on the tire section to be assumed under the normal internal pressure of the tire mounted on a standard rim and under the normal load to a point B at which a straight line parallel to the rotary axis of the tire and passing through a position corresponding to 27% of a height H of the tire under normal load and crossed with the inner wall of the tire and by a segment $\overline{AD}$ parallel with the segment $\overline{BC}$ and drawn from a point A at which a straight line passing through a position corresponding to 40% of the above mentioned height H and parallel to the rotary axis of the tire crosses the internal wall of the tire. The bead portion reinforcement makes use of a cord having a modulus which corresponds to 15 to 60% of that of the ply cord carcass, and a tension at 100% elongation of the soft stiffener corresponds to 5 to 30% of that of the hard stiffener.

Further objects and features of the invention will be fully understood from the following detailed description with reference to the accompanying drawings, in which:

DETAILED DESCRIPTION OF THE PREFERRED EMBODIMENTS

Figure 1:
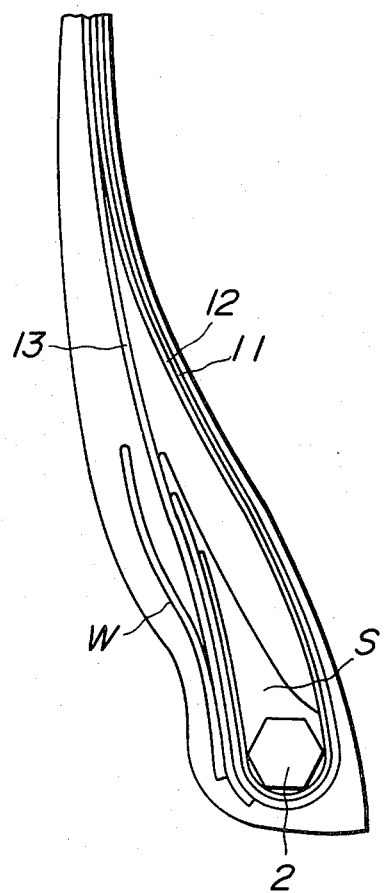
FIG. 1 is a diagrammatic cross-sectional view of a bead portion of a combi-radial tire which makes use of a conventional bead portion reinforcement.

FIG. 1 shows an example of a carcass ply arrangement for a bead portion of a conventional combi-tire. In the example shown in FIG. 1, use is made of three carcass plies of which inner plies 11, 12 are wound around a bead core 2 from the inside toward the outside thereof to form a turn-up portion. An outer ply 13 is wound around the bead core 2 from the outside toward the inside thereof to form an up-down construction. In FIG. 1, W designates a wire chafer and S a stiffener. Such a carcass ply arrangement shown in FIG. 1 considerably deteriorates the productivity of the tire during its shaping step. But, such a carcass ply arrangement has been inevitably adopted owing to the following reasons. That is, the combi-tire for heavy load vehicles tends to produce a stress concentration at the upper end of the turn-up portion of the carcass due to the tension balance of the carcass produced when the inflated tire runs under load, thereby inducing a separation failure at the bead portion which is a vital defect to the tire.

Figure 2:
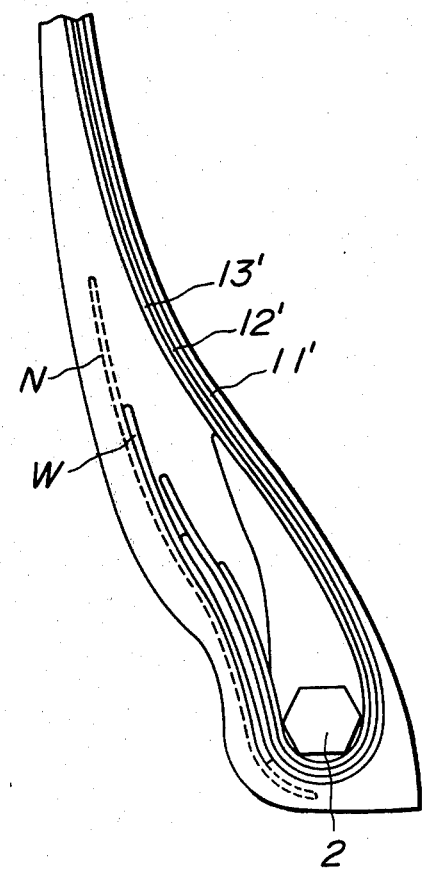
FIG. 2 is a diagrammatic cross-sectional view of a bead portion of a combi-radial tire which makes use of another conventional bead portion reinforcement.

In order to eliminate such deterioration of the productivity of the tire, another example of a combi-tire shown in FIG. 2 has been proposed. In the conventional combi-tire shown in FIG. 2, all of three plies $11'$, $12'$, $13'$ of the carcass are wound around the bead core 2 from the inside toward the outside thereof to form the turn-up portion. On the upper end of the turn-up portion a bead portion reinforcement is arranged and composed of one chafer including metal cords and an additional chafer N including organic textile cord layers.

Such a conventional carcass ply arrangement of the combi-tire shown in FIG. 2 is advantageous with respect to the productivity of the tire, but it is impossible to completely prevent the separation failure induced at the upper ends of the turn-up portions of the carcass and the upper end of the bead portion reinforcement. As a result, the tire shown in FIG. 2 has the disdvantage that its durable life is short.

In the present invention, the carcass composed of a plurality of organic textile cord layers is wound around the bead core from the inside toward the outside thereof to form the turn-up portion so as to form a so-called simultaneous turn-up bead portion construction for the purpose of improving the productivity of the tire. In addition, the bead portion reinforcement does not use a reinforcing layer including metal cords in view of improving the ability of the tire. The present invention is based on the above mentioned conditions.

In the present invention, the upper end of the turn-up portion of the carcass and the upper end of the bead portion reinforcement covering the outside upper end of the turn-up portion of the carcass are located at a region other than the bead portion flexible region. The use of such measure is obtained by careful investigations on the origin of inducing separation failure at the bead portion. The arrangement of the bead portion for realizing the improved rigid distribution of the bead portion and the cord modulus with respect to the carcass ply cord and the arrangement and physical property of the stiffener are optimized. The use of such a measure provides the important advantage that the combi-radial tire can be applied to the pneumatic radial tire for heavy load vehicles including the bead portion having excellent durability.

Figure 3:
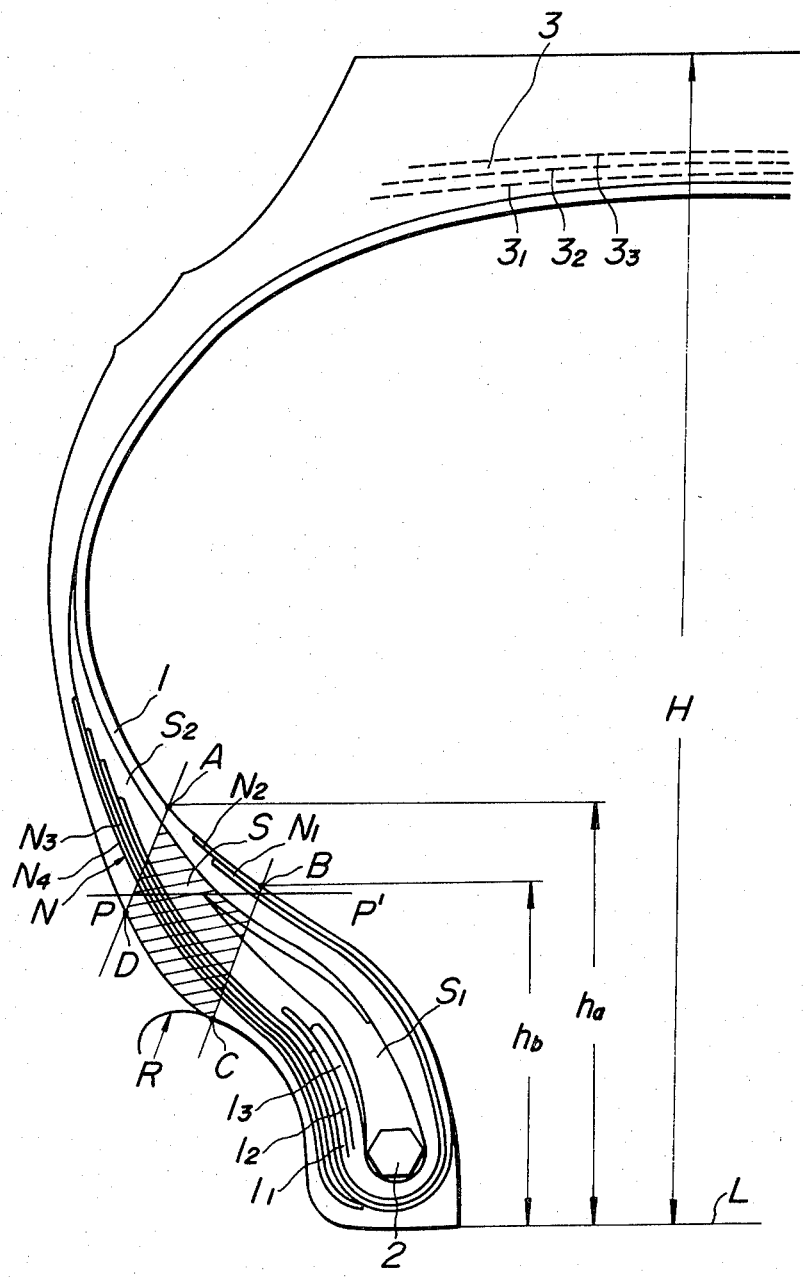
FIG. 3 is a diagrammatic cross-sectional view of one embodiment of a pneumatic radial tire for heavy load vehicles according to the invention.

FIG. 3 shows one embodiment of a pneumatic radial tire for heavy load vehicles according to the invention which eliminates the above mentioned disadvantages which have been encountered with the conventional combi-tires shown in FIGS. 1 and 2. In FIG. 3, reference numeral 1 designates a carcass, $1_1$, $1_2$, $1_3$ . . . plies thereof, 2 a bead core, 3 a belt, and $3_1$, $3_2$, $3_3$ cord layers thereof. Each ply of the carcass 1 is composed of organic textile cords, particularly polyester cords and the belt 3 is composed of metal cords, particularly steel cords. N designates a bead portion reinforcement as a whole, $N_1$, $N_2$, $N_3$, $N_4$ show organic textile cord layers. $S_1$ illustrates a hard stiffener and $S_2$ a soft stiffener. R shows an inner surface contour line of a rim on which is mounted an inflated tire with a normal inner pressure under normal load. H is a tire height measured from a bead base L under the above mentioned load.

Each ply cord of the three plies of the carcass 1 is arranged in the radial plane of the tire and all of these carcass plies are wound around the bead core 2 from the inside toward the outside thereof to form a turn-up portion, the upper ends of the turn-up portion being at different levels. The hard stiffener $S_1$ and soft stiffener $S_2$ are sandwiched between the carcass ply and the turn-up portion thereof.

The bead portion reinforcement N is composed of two nylon cord layers $N_1$, $N_2$ extending over and covering the upper end of the turn-up portion of the carcass ply and including cords arranged along the turn-up portion of the carcass ply and having cords crossed with the cords of the carcass ply the nylon cord layers $N_1$, $N_2$ including cords crossed with each other, covering the winding region of the turn-up portion of the carcass around the bead core 2 and raising up along the inner wall of the tire. Two nylon cord layers $N_3$, $N_4$ extend over and cover the upper end of the turn-up portion of the cord layers $N_1$, $N_2$ and are anchored at the bead base, the upper ends of the two nylon cord layers $N_3$, $N_4$ being also at different levels to prevent a sudden change in rigidity thereof.

At least two nylon cord layers may be arranged along the rising-up portions of the cord layers $N_1$, $N_2$ at the inside of the tire and extending above the upper ends of the cord layers $N_1$, $N_2$ and are anchored at the bead base.

In the present invention, it is most important to arrange the upper end of the turn-up portion of the carcass ply and the outside upper end of the bead portion reinforcement covering the above mentioned upper end of the turn-up portion of the carcass ply 1 at positions other than a bead portion flexible region. This will be described later.

As shown in FIG. 3, the bead side of the bead portion flexible region is defined by a segment BC. The segment BC is formed by connecting a point C located on a tire sectional plane on the inflated tire with the normal internal pressure under the normal load and separating the outer contour of the bead portion of the tire from the rim R to a point B at which a straight line parallel to the rotary axis of the tire and passing a position corresponding to 27% of the height H of the tire under normal load and measured from the bead base L and crosses with the inner wall of the tire. The side portion side of the bead portion flexible region is defined by a segment AD drawn from a point A in parallel with the segment BC. The point A is a crossing point at which a straight line passing a position corresponding to 40% of the tire height and extending in parallel with the rotary axis of the tire crosses with the inner wall of the tire. In FIG. 3, $h_a$, $h_b$ are heights of the points A and B measured from the base line L.

The reasons why the upper end of the turn-up portion of the carcass ply and the outside upper end of the bead portion reinforcement are located at positions other than the above mentioned bead portion flexible region are as follows. That is, in the bead portion flexible region, the reaction force of the flange of the rim R produced at the tire when it runs under load and the inner pressure of the inflated tire tend to produce a compressive force and the elongation of the organic textile cord produces a large inner strain. As a result, if the upper ends of the turn-up portion of the carcass ply and the outside upper ends of the bead portion reinforcement are located at the above mentioned bead portion flexible region, there is a risk of separation failure being induced at respective upper ends.

As shown in FIG. 3, the nylon cord layers $N_1$, $N_2$ of the bead portion reinforcement N are substantially continuously extended up to the inner side of the tire, preferably up to a position exceeding the point B on the inner wall of the tire and preferably between the points A and B for the purpose of improving the rigidity of the bead portion.

Figure 4:
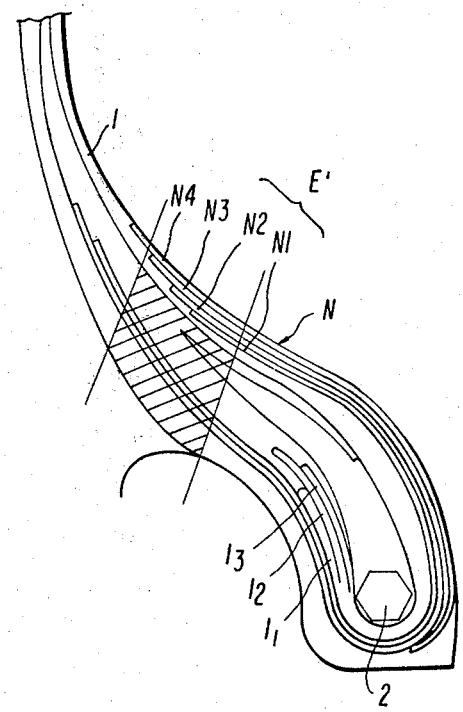
FIG. 4 is a diagrammatic cross-sectional view of a second embodiment of a pneumatic radial tire for heavy load vehicles according to the invention.

In addition, the nylon cord layers $N_3$, $N_4$ arranged along the outside of the tire improved the rigidity of the bead portion. As shown in FIG. 4, layers $N_3$, $N_4$ may be arranged along the inside of the tire extending beyond and covering the upper ends of layers $N_1$, $N_2$ at the inside of the tire. The lower end of the layers $N_3$, $N_4$ is anchored to the bead base.

The organic textile cord used for the bead portion reinforcement N has a modulus which is smaller than that of the carcass ply cord for the purpose of avoiding a rigid dislocation of the bead portion and has a value which is 15 to 60% of the modulus of the carcass ply cord. If the carcass ply is composed of polyester cords, it is preferable to use nylon cord as the organic textile cord of the bead portion reinforcement N.

As seen from above, the upper end of the turn-up portion of the carcass ply 1 and the outside upper end of the cord layer of the bead portion reinforcement are terminated at positions facing the soft stiffener $S_2$ disposed on the hard stiffener $S_1$ for the purpose of alleviating the inner stress of the bead portion. The upper end of the turn-up portion of the carcass ply is located at a position which is inward from the segment BC for defining the bead portion flexible region and the outside upper end of the cord layer of the bead portion reinforcement is located at a position which is outward from the segment AD for the purpose of improving the rigidity distribution of the bead portion.

The stiffener S is composed of the hard stiffener $S_1$ and soft stiffener $S_2$ is substantially triangular in section and extends upwardly in an elongate curved form. The hard stiffener $S_1$ has a base portion whose total surface makes contact with the bead core 2 and has a thickness gradually increased inwardly along the carcass line. The soft stiffener $S_2$ is bifurcated at its lower half into two portions which serve to sandwich the upper half of the hard stiffener $S_1$ therebetween. As a result, one portion of the soft stiffener $S_2$ is interposed between the hard stiffener $S_1$ and the carcass 1, while the other portion of the soft stiffener $S_2$ is interposed between the hard stiffener $S_1$ and the bead portion reinforcement N and located at a position on the upper end of the turn-up portion of the carcass ply 1.

The amount of rubber of the soft stiffener $S_2$ interposed between the hard stiffener $S_1$ and the carcass 1 preferably has a volume ratio of a range of 30 to 60% of the volume of the amount of rubber of the soft stiffener $S_2$ interposed between the hard stiffener $S_1$ and the bead portion reinforcement and located at a position extending along the hard stiffener $S_1$.

It is preferable that that portion of the soft stiffener $S_2$ which is interposed between the hard stiffener $S_1$ and the carcass 1 is of substantially uniform thickness.

In the present invention, the tension at 100% elongation of the soft stiffener $S_2$ must correspond to 5 to 30% of that of the hard stiffener $S_1$. This is for the purpose of improving the rigid distribution of the bead portion and for alleviating the concentration of the stress to the bead portion.

Experimental tests have been effected on a test tire having a size of TBR 10.00R20 14PR mounted on a standard rim of 7.50 V and inflated with a normal internal pressure of 7.25 kg/cm$^2$ under normal load of 2,425 kg.

In the test tire, the carcass 1 is composed of three plies including 1,500 d/3 polyester cords having an elongation modulus of elasticity of 610 kg/mm$^2$ and arranged in the radial direction of the tire. All of these plies are wound around the bead core at the same time to form the turn-up portion. The intermediate ply $l_2$ rises up to a height which corresponds to 20% of the tire height H under the above mentioned normal load. The upper end of the turn-up portion of the inside ply $l_3$ is located at a position which is lower than the upper end of the intermediate ply $l_2$ by 7 mm and the upper end of the turn-up portion of the outside ply $l_1$ is located at the position which is lower than the upper end of the turn-up portion of the inside ply $l_3$ by 7 mm.

The stiffener S is composed of a hard stiffener $S_1$ directly riding on the bead core 2 and having a tension at 100% elongation of 1.65 kg/mm$^2$. A soft stiffener $S_2$ is formed of soft rubber having a tension at 100% elongation of 0.26 kg/mm$^2$. The lower half of the soft stiffener $S_2$ is bifurcated into two portions and one side portion is interposed between the hard stiffener $S_1$ and the carcass 1 and the other side portion is interposed between the hard stiffener $S_1$ and the bead portion reinforcement. The outside upper end of the bead portion reinforcement and the upper end of the turn-up portion of the carcass ply are embedded in the other side portion of the soft stiffener $S_2$.

In the present example, the amount of inside rubber interposed between the hard stiffener $S_1$ and the carcass 1 is 50%, which is a suitable value selected from 30% to 60% of the amount of outside rubber interposed between the hard stiffener $S_1$ and the bead portion reinforcement N. This volume ratio of the soft rubber of the soft stiffener $S_2$ lying inside and outside of the hard stiffener $S_1$ is measured at a position below a straight line P–P′ passing through the upper end in the radial direction of the tire of the hard stiffener $S_1$ and extending in parallel with the rotary axis of the tire and bifurcating the soft stiffener $S_2$.

The bead portion reinforcement N is composed of nylon cord layers $N_1$, $N_2$ extending from an intermediate point between points A, B on the internal wall of the tire and passing along the internal wall of the tire and covering the upper end of the turn-up portion of the carcass ply 1. The outside upper end of the nylon cord layers $N_1$, $N_2$ terminate at a position which is considerably above the upper end of the turn-up portion of the carcass ply 1 and the segment AD, and nylon cord layers $N_3$, $N_4$ attached to a portion extending between a position where these layers are anchored at the bead base and a position which is located above the upper end of the nylon cord layers $N_1$, $N_2$. The upper end of the nylon cord layers $N_3$, $N_4$ terminate in the soft stiffener $S_2$.

The above mentioned test tire shown in FIG. 3 and conventional test tires shown in FIGS. 1 and 2 which are the same in size as the test tire shown in FIG. 3 have been subjected to tests by which the durability of the bead portion until the bead portion induces separation failure was measured. The tests have been effected at a speed of 70 km/hour under load of 5,000 kg.

Let it be assumed that the durability of the bead portion of a general construction of the all-steel tire comprising a single ply carcass including steel cords and one wire chafer be 100, then the index numbers of the durability of the bead portion of the conventional tires shown in FIGS. 1 and 2 were 85 and 65, respectively. The index number of the durability of the bead portion of the pneumatic radial tire for heavy load vehicles according to the invention was however 120. The tire according to the invention does not deteriorate the productivity of the tire contrary to the conventional tire shown in FIG. 1 and further effectively prevents the separation failure to be produced at the upper end of the turn-up portion of the carcass ply and the outside upper end of the bead portion reinforcement. This considerably improves the durable life of the tire.

As stated hereinbefore, the pneumatic radial tire for heavy load vehicles according to the invention can effectively be applied to the combi-radial tire, particularly pneumatic radial tire for heavy load vehicles without deteriorating the productivity of the tire and can effectively improve the durability of the bead portion of the tire.

What is claimed is:

1. A pneumatic radial tire for heavy load vehicles comprising; a body reinforcement including in combination a carcass composed of at least two organic textile cord plies including cords arranged in a plane inclusive of the rotary axis of the tire or a plane extremely slightly inclined with respect to the above mentioned plane and wound around a bead core from the inside toward the outside thereof to form a turn-up portion; hard and soft stiffeners disposed one upon the other on the bead core and sandwiched between the carcass and its turn-up portion; a belt composed of a plurality of metal cord layers superimposed about the crown portion of the carcass; and a bead portion reinforcement comprising at least two organic textile cord layers extending along the turn-up portion of the carcass and extending beyond and covering the upper ends of the turn-up portion of the carcass, the cords of these plies being crossed with each other, wherein at least two layers of said bead portion reinforcement substantially continuously covers the carcass ply from the bead core radially towards the inside of the tire, the outside upper end of the turn-up portion of the carcass ply and the upper end of the bead portion reinforcement covering the upper end of the turn-up portion of the carcass ply arranged at an area other than a bead portion flexible region defined by a segment $\overline{BC}$ for connecting a point C at which the outer contour of the bead portion of the tire is separated from the rim on the tire section under the normal internal pressure of the tire mounted on a standard rim and under the normal load to a point B at which a straight line parallel to the rotary axis of the tire and passing through a position corresponding to 27% of a height H of the tire under normal load and crosses with the inner wall of the tire and by a segment $\overline{AD}$ parallel with the segment $\overline{BC}$ and drawn from a point A at which a straight line passing through a position corresponding to 40% of the above mentioned height H and parallel to the rotary axis of the tire crosses with the inner wall of the tire, the bead portion reinforcement comprising a cord having a modulus which corresponds to 15 to 60% of that of the ply cord of the carcass, and a tension at 100% elongation of the soft stiffener corresponding to 5 to 30% of that of the hard stiffener.

2. The pneumatic radial tire according to claim 1, wherein the carcass comprises three plies each including polyester cords.

3. The pneumatic radial tire according to claim 1, wherein the bead portion reinforcement comprises at least two cord layers extending radially towards the inside of the tire and at least two cord layers extending beyond and covering the upper end of the turn-up portion of the carcass ply and extending downwardly to the anchored ends thereof at the bead base.

4. The pneumatic radial tire according to claim 1, wherein the bead portion reinforcement comprises said at least two cord layers extending radially towards the inside of the tire and, at least two additional cord layers extending beyond and covering the upper end of the cord layers at the inside of the tire and extending downwardly to the anchored ends thereof at the bead base.

5. The pneumatic radial tire according to claim 1, wherein said soft stiffener is interposed between said hard stiffener and said carcass at least at the outer region in the radial direction of the tire.

6. The pneumatic radial tire according to claim 1, wherein the rubber volume of said soft stiffener interposed between said hard stiffener and said carcass is 30 to 60% of the rubber volume of said soft stiffener interposed between said hard stiffener and the bead portion reinforcement at the level lower than that of said hard stiffener.

7. The pneumatic radial tire according to claim 1, wherein said soft stiffener portion interposed between said hard stiffener and said carcass is of substantially uniform thickness.

8. The pneumatic radial tire according to claim 1, wherein the cord layer of the bead portion reinforcement extending along the turn-up portion of the carcass ply covers at least 27% of the tire height H mounted on a standard rim and inflated by the normal internal pressure and subjected to the normal load.

9. The pneumatic radial tire according to claims 1 and 7, wherein said soft rubber stiffener is bifurcated at its lower end to form two portions and the top portion of said hard stiffener is sandwiched between said two portions.

* * * * *